(12) United States Patent
Scardino et al.

(10) Patent No.: US 6,814,771 B2
(45) Date of Patent: Nov. 9, 2004

(54) EVAPORATIVE EMISSIONS CONTROL DEVICE WITH INTERNAL SEALS

(75) Inventors: Eileen Alanna Scardino, Rochester, NY (US); Aleksandr Shneydman, Rochester, NY (US); Hsuh Yao, Mendon, NY (US)

(73) Assignee: Delphi Technologies, Inc., Troy, MI (US)

( * ) Notice: Subject to any disclaimer, the term of this patent is extended or adjusted under 35 U.S.C. 154(b) by 99 days.

(21) Appl. No.: 09/999,554

(22) Filed: Nov. 30, 2001

(65) Prior Publication Data

US 2003/0101871 A1 Jun. 5, 2003

(51) Int. Cl.[7] .............................................. B01D 53/04
(52) U.S. Cl. ........................ 55/385.3; 55/490; 55/502; 55/523; 55/DIG. 28; 55/DIG. 30; 123/198 E; 422/177; 422/179; 422/180
(58) Field of Search ............................... 55/385.3, 490, 55/502, 523, DIG. 28, DIG. 30; 123/198 E; 422/177, 179, 180

(56) References Cited

U.S. PATENT DOCUMENTS

| | | | |
|---|---|---|---|
| 3,854,888 A | | 12/1974 | Frietzsche et al. |
| 4,105,414 A | * | 8/1978 | Garcea .................. 55/DIG. 30 |
| 4,322,230 A | | 3/1982 | Schoen et al. |
| 4,381,929 A | | 5/1983 | Mizuno et al. |
| 4,386,947 A | | 6/1983 | Mizuno et al. |
| 4,416,675 A | | 11/1983 | Montierth |
| 4,419,108 A | | 12/1983 | Frost et al. |
| 4,444,721 A | * | 4/1984 | Ohkata ........................ 422/179 |
| 5,195,319 A | * | 3/1993 | Stobbe .................. 55/DIG. 30 |
| 5,246,472 A | * | 9/1993 | Herman et al. ........ 55/DIG. 30 |
| 5,274,049 A | * | 12/1993 | Zielinski et al. ............. 525/356 |
| 5,346,675 A | * | 9/1994 | Usui et al. ............. 55/DIG. 30 |
| 5,385,873 A | | 1/1995 | MacNeill |
| 5,468,384 A | * | 11/1995 | Garcera et al. ........ 55/DIG. 30 |
| 5,589,119 A | * | 12/1996 | Hetherington ............... 264/129 |
| 5,656,245 A | * | 8/1997 | Fujisawa et al. ............. 422/179 |
| 5,866,079 A | * | 2/1999 | Machida et al. ............. 422/179 |
| 5,897,676 A | * | 4/1999 | Engel et al. .................. 55/502 |
| 5,910,637 A | | 6/1999 | Meiller et al. |
| 5,914,294 A | | 6/1999 | Park et al. |
| 5,924,410 A | | 7/1999 | Dumas et al. |
| 5,957,114 A | | 9/1999 | Johnson et al. |
| 6,041,761 A | | 3/2000 | Uto et al. |
| 6,182,693 B1 | | 2/2001 | Stack et al. |
| 6,190,432 B1 | * | 2/2001 | Gieseke et al. ............... 55/502 |
| 6,230,693 B1 | | 5/2001 | Meiller et al. |
| 6,253,792 B1 | * | 7/2001 | Williams et al. ........ 55/DIG. 30 |
| 6,390,073 B1 | | 5/2002 | Meiller et al. |
| 6,460,517 B1 | | 10/2002 | Dauer |
| 6,520,200 B1 | | 2/2003 | Lawrukovich et al. |
| 6,546,955 B1 | | 4/2003 | Burke |
| 6,550,775 B2 | * | 4/2003 | Knapp ......................... 277/314 |
| 6,635,227 B1 | * | 10/2003 | Shibata et al. ............... 422/179 |

FOREIGN PATENT DOCUMENTS

JP          10-37812         7/1996

OTHER PUBLICATIONS

Thomas Charles Meiller, et al., "Evaporative Canister Assembly and Apparatus", USSN 10/668,512, Filed Sep. 23, 2003, 17 pages.

U.S. patent application Ser. No. 09/749,294, Scardino et al., filed Dec. 27, 2000.

* cited by examiner

*Primary Examiner*—Duane Smith
*Assistant Examiner*—Minh-Chau T. Pham
(74) *Attorney, Agent, or Firm*—Jimmy L. Funke

(57) ABSTRACT

A hydrocarbon scrubber including a monolith; a seal disposed concentrically around an end of the monolith, wherein the seal includes an inner surface having a diameter equal to or less than an outer diameter of the monolith, a shoulder member protruding from the seal and physically contacting at least a portion of an end face of the monolith, and a rib member disposed on an outer side of the seal and in physical contact with the shell.

24 Claims, 3 Drawing Sheets

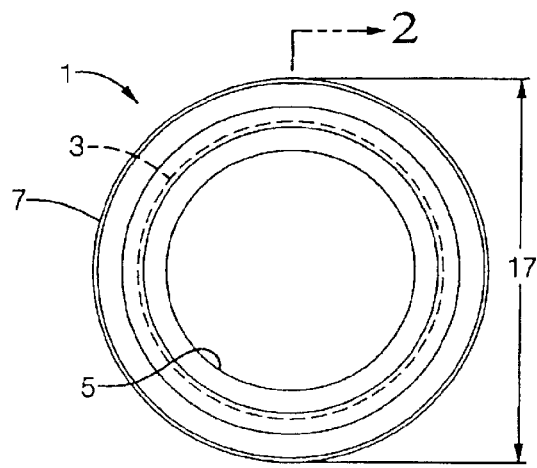
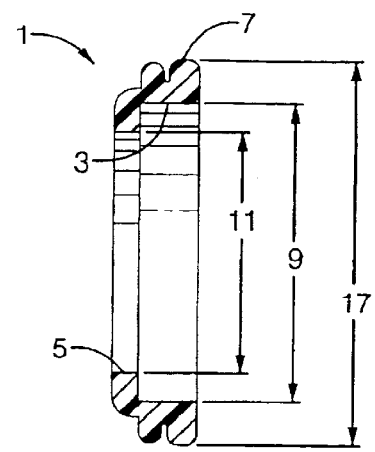
FIG. 1  FIG. 2
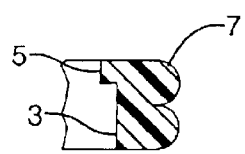  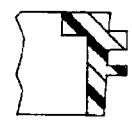
FIG. 3 A  FIG. 3 B  FIG. 3 C
  
FIG. 3 D  FIG. 3 E  FIG. 3 F
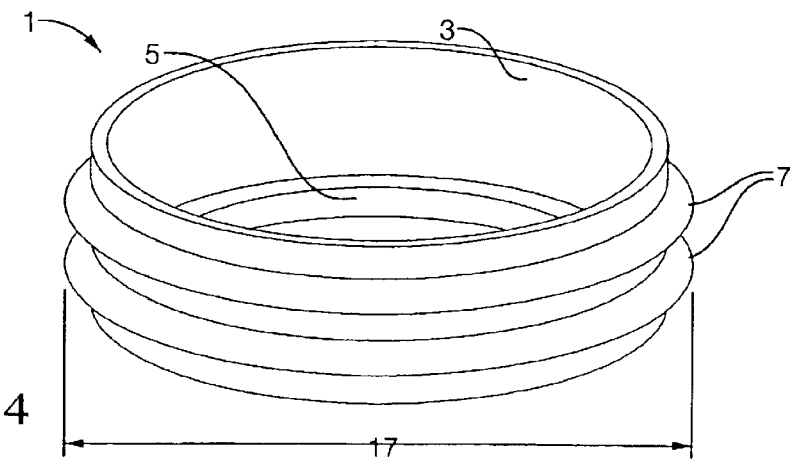
FIG. 4

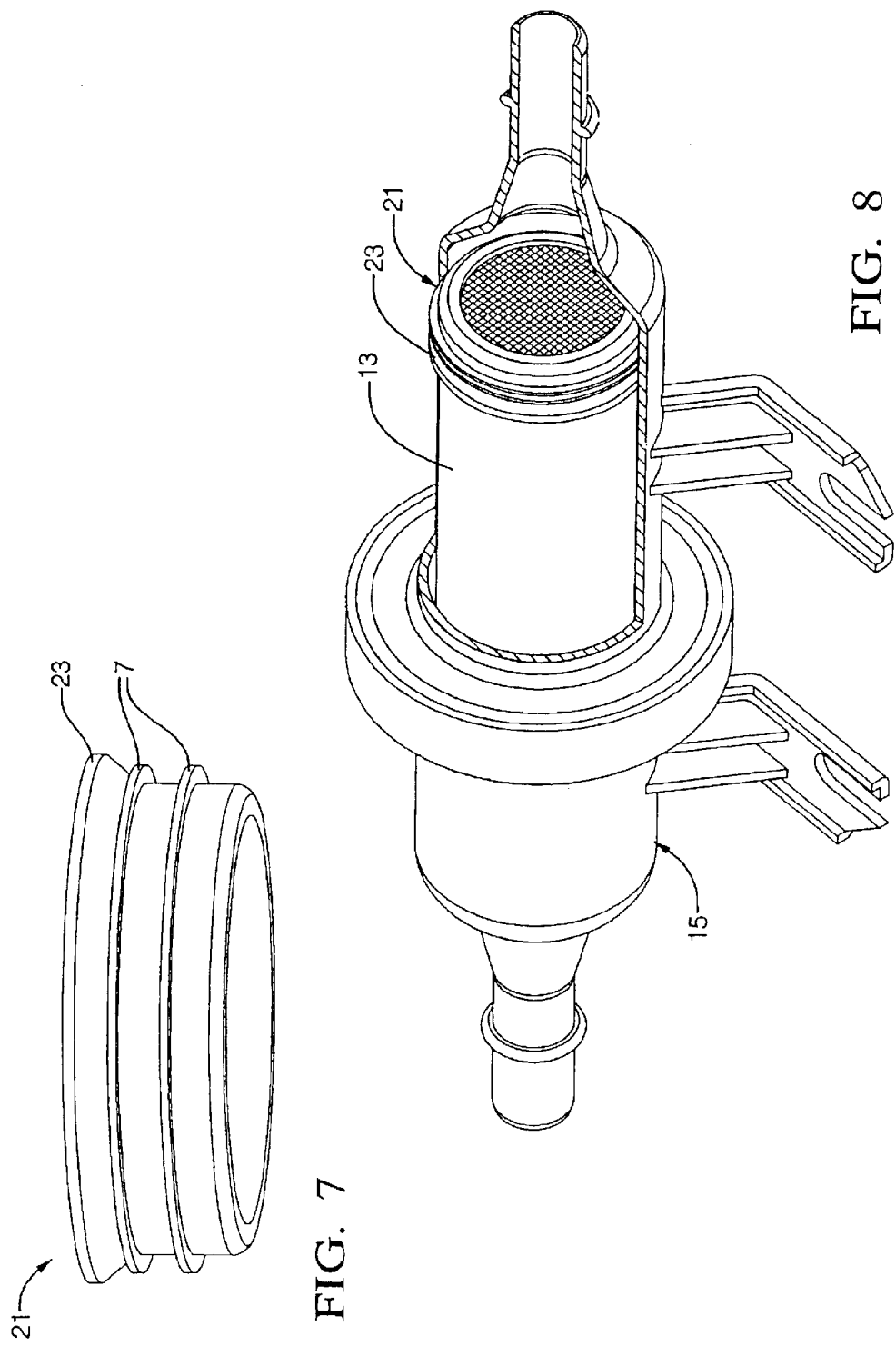

EVAPORATIVE EMISSIONS CONTROL DEVICE WITH INTERNAL SEALS

BACKGROUND

The disclosure relates to removing hydrocarbons from the evaporative emissions of a motor vehicle, more particularly, to the seals employed within a hydrocarbon scrubber used in treating evaporative emissions from a motor vehicle fuel tank.

The fuel tank of a motor vehicle is a potential source of evaporative emissions of hydrocarbons. Evaporative emissions result from vaporization of fuel due to diurnal changes in ambient pressure and/or temperature, and the escape of fuel vapors during refueling of the vehicle. The venting of fuel vapor from the fuel tank due to diurnal pressure and/or temperature changes (i.e., diurnal emissions) is responsible for a majority of motor vehicle evaporative emissions. Diurnal emissions result when air flows into the fuel tank as a result of changes in environmental pressure and/or temperature. Once inside the fuel tank, the air becomes saturated with fuel vapor. Changes that result in a higher pressure within the fuel tank cause this air saturated with fuel vapor to flow back to the atmosphere. As the ambient pressure and temperature change, the process repeats. The net effect is the undesirable release of raw hydrocarbons into the atmosphere.

To limit or eliminate the occurrence of evaporative emissions, the air flow out of the fuel tank is treated to remove the hydrocarbons and other contaminants with a hydrocarbon scrubber. A hydrocarbon scrubber includes a sorbent material (i.e., adsorbent, absorbent, or both), disposed in fluid communication with the fuel tank and the atmosphere through a system of conduits and valves.

The sorbent material employed in the hydrocarbon scrubber, which often takes the form of a monolith, comprises a sorbent formed into a rigid or semi-rigid embodiment disposed within an evaporative canister, also known as a shell. The shell is connected to the conduits and valves, thereby providing fluid communication from the fuel tank to the atmosphere through the sorbent monolith. Efficient and effective removal of hydrocarbons by the hydrocarbon scrubber can be accomplished when the sorbent monolith sealably engages the shell. However, effective sealing of a sorbent monolith in a hydrocarbon scrubber remains an area in need of improvement.

The need for improvement in providing a sorbent monolith seal is the result of several factors inherent to the scrubber system. To remove hydrocarbons, the sorbent should possess a large surface area. To provide the needed surface area, sorbent monoliths typically comprise thin walled channels, which render the sorbent monolith fragile and prone to physical destruction upon application of force or vibration. Utilization in a moving vehicle, typically subjects the sorbent monolith to significant amounts of vibration and other motions incompatible with the thin-walled design. Other factors particular to a motor vehicle applications include the temperature extremes a sorbent monolith and surrounding system are routinely subjected to, including both contraction upon cooling, and expansion upon heating, as well as the sustained extremes encountered under normal operational conditions (e.g., temperatures ranging from about −40° C. to about 200° C.). Thus, if the hydrocarbon scrubber system is to be durable and function efficiently, the sorbent monolith should be sealed and protected within the shell.

Sorbent monolith seals include sponge rings and various types of rubber O-rings. However, upon insertion of a sorbent monolith into the shell, the seals often "roll-off" the end and thus do not adequately seal or provide protection of the monolith within the shell.

When seals are utilized that are of a size so as to provide the necessary seal and prevent roll-off, greater insertion force is required. This greater insertion force can necessitate the application of an exterior lubrication to the outer housing or seals prior to sorbent monolith insertion. The application of exterior lubrication adds undesirable cost and complexity to the hydrocarbon scrubber.

SUMMARY

Disclosed herein is a hydrocarbon scrubber and a method for use thereof. The hydrocarbon scrubber comprises: a monolith; a seal disposed concentrically around an end of the monolith, wherein the seal comprises an inner surface having a diameter equal to or less than an outer diameter of the monolith, a shoulder member protruding from the seal and physically contacting at least a portion of an end face of the monolith, and a rib member disposed on an outer side of the seal and in physical contact with the shell.

The method for using a hydrocarbon scrubber, comprises: introducing a fuel gas to a monolith first end of a monolith, removing hydrocarbons from the introduced gas to produce a clean gas, exhausting the clean gas through a second end of the monolith, introducing atmospheric gas through the second end of the monolith to remove the hydrocarbons from the monolith, wherein the a seal is disposed concentrically around an end of the monolith.

The above described and other features are exemplified by the following figures and detailed description.

BRIEF DESCRIPTION OF THE DRAWINGS

Referring now to the figures wherein the like elements are numbered alike:

FIG. 1 illustrates a top view of an embodiment of a seal;

FIG. 2 illustrates a cross-sectional view along line AA of FIG. 1;

FIGS. 3A–3F each depict a partial cross-sectional view of various embodiments of rib members of the seal;

FIG. 4 is a perspective view of an embodiment of a seal;

FIG. 7 is a perspective view of another embodiment of a seal.

FIG. 8 is a partial cross sectional view of an embodiment of a sorbent monolith having a seal installed on an end.

DETAILED DESCRIPTION OF THE PREFERRED EMBODIMENTS

Figure 5:
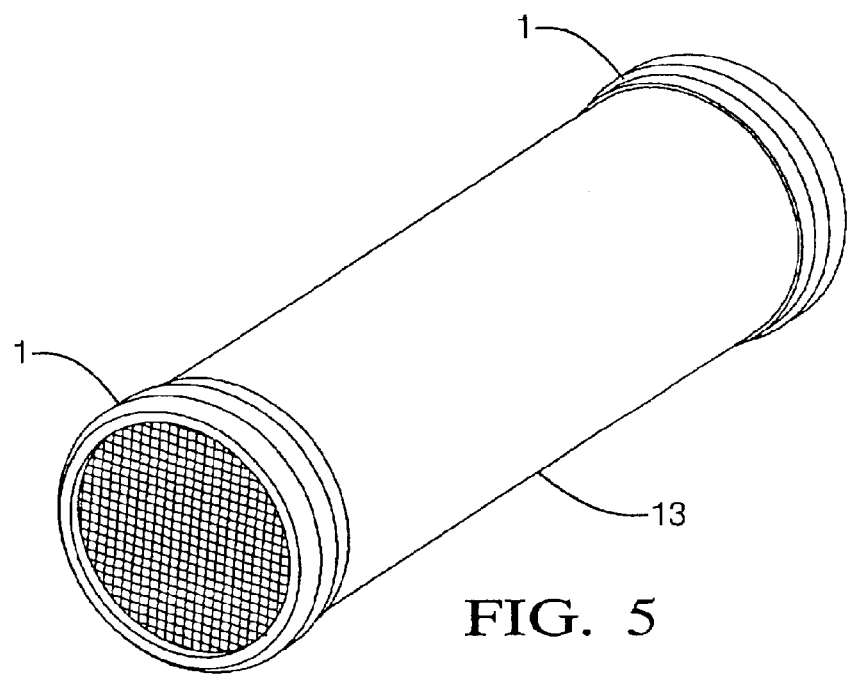
FIG. 5 is a perspective view of an embodiment of a sorbent monolith having seals installed on each end.

Motor vehicle manufacturers have reduced the level of diurnal emissions through the use of hydrocarbon scrubber systems having a sorbent disposed within a shell (i.e., evaporative canister), such as the shell structure and operation set forth in U.S. Pat. No. 5,910,637 to Meiller, et al. Generally, hydrocarbon scrubber systems have a shell with a vapor inlet, a purge port, and a vent port, all in fluid communication with each other. The vapor inlet is also in fluid communication with an air space within the fuel tank through a vapor conduit. The purge port is in fluid communication with the combustion air intake of the motor vehicle engine through a valved conduit, and the vent port is in fluid communication with the atmosphere. The sorbent monolith is located within the shell between the vapor inlet, and both the vent port and the purge port.

In operation, higher than ambient pressure in the fuel tank causes air laden with fuel vapor to flow through the vapor conduit and vapor inlet into the sorbent disposed within the shell. The sorbent strips fuel vapor from the air as it flows through the shell and to the atmosphere through the vent port. When the engine is running, the combustion air intake is maintained at sub-atmospheric pressure. This creates a pressure differential that causes the purge port valve to open, thus connecting the purge port of the canister to the combustion air intake of the engine. This pressure differential results in fresh air being drawn through the vent port, through the sorbent, out of the purge port, and into the combustion air inlet of the engine. This flow of fresh air through the sorbent serves to strip the sorbent of accumulated fuel vapor and/or hydrocarbons, thereby purging the sorbent and the shell of fuel vapor. When the engine is shut-off, the process repeats.

In the mode of operation descried above, it is apparent that in order for the hydrocarbon scrubber to function efficiently, as well as provide years of durable service, the sorbent is preferably disposed within the shell such that fuel vapor entering the scrubber passes through and not around the sorbent monolith. To ensure that the fuel vapor passes through the sorbent monolith, a seal(s) can be employed between the sorbent monolith and the shell, thereby insulating the sorbent monolith from harmful vibration and movement while directing the fuel vapor therethrough.

Attention is now directed to FIGS. 1 and 2, which illustrates a top-view of an embodiment of a sorbent monolith seal suitable for use with a cylindrically shaped sorbent monolith. The sorbent monolith seal 1 is adaptable to engage the end portion of a sorbent monolith. The seal comprises a base member 3, a shoulder member 5, and a rib member 7. The rib member 7 protrudes out from the outer side of the base member 3, on the side opposite the sorbent monolith. The seal 1 is proportioned to sealably engage both the monolith and the shell. Preferably, the outer diameter 17 formed by the rib member 7 is adaptable so as to sealably engage the shell into which the sorbent monolith having the seal is ultimately placed. Similarly, the inner diameter 9 formed by the base member 3 is sized to engage an outer diameter of the sorbent monolith. Preferably, the inner diameter 9 of seal 1 is slightly less than the outer diameter of the sorbent monolith. This allows the seal to be installed by stretching it over the sorbent monolith end, allowing for a compressive fit therebetween. The shoulder member inner diameter 11 is similarly less than the outer diameter of the sorbent monolith. Once the seal is installed over an end of the sorbent monolith, the shoulder member 5, which can be a complete ring, or one or more inward projecting protrusions, abuts the sorbent monolith end, securing the seal in place and preventing the seal from rolling off of the sorbent monolith during insertion into the shell.

The seal 1 preferably comprises a resilient, pliable material capable of absorbing vibrations and shock, e.g., an elastic material. In order to provide the desired structural integrity, the material preferably possesses a durometer hardness on a Shore A scale of greater than or equal to about 20, with greater than or equal to about 25 more preferred, and greater than or equal to about 30 especially preferred. Similarly, in order to enable absorption of vibrations and the like, the seal preferably possesses a durometer hardness on a Shore A scale less than or equal to about 50, with less than or equal to about 45 more preferred, less than or equal to about 35 even more preferred. Possible elastomeric materials comprise various rubbers such as silicone, fluorosilicone, epichlorohydrin, and the like, as well as combinations comprising at least one of the foregoing materials.

Proper engagement, i.e., sealing, of the seal 1 with the interior surface of the shell can be attained with various designs of the rib member 7. Suitable geometries include those capable of engaging and maintaining sealable contact with the shell, and that do not require an insertion force that will damage the sorbent monolith, the seal, or both. Some possible geometries of rib members 7 are illustrated in FIGS. 3A–3F. As is shown, the geometry can include one or more rounded protrusions (FIG. 3A), one or more triangular, pointed, or saw-toothed protrusions (FIGS. 3B, 3D, 3G, and 3H), one or more squared protrusions (FIGS. 3C, 3H, 3I, 4 and 7), one or more hooked or curved protrusions (FIGS. 3E, 3F, and 3G), and the like, as well as combinations comprising at least one of the foregoing geometries. When multiple protrusions are employed, each protrusion can comprise a similar or different geometry and or size as the other protrusion(s). (See FIGS. 3C, 3G, 3H, and 3I)

Although the ribs 7 enhance engagement and sealing of the seal with the shell, it may be beneficial to dispose a lubricant dispersed on the seal or in the seal composition facilitate assembly of the scrubber. Suitable lubricants include, for example, talc, silica, fluorocarbon polymers (e.g., Teflon, and the like), and the like, as well as combinations comprising at least one of the foregoing lubricants.

Figure 6:
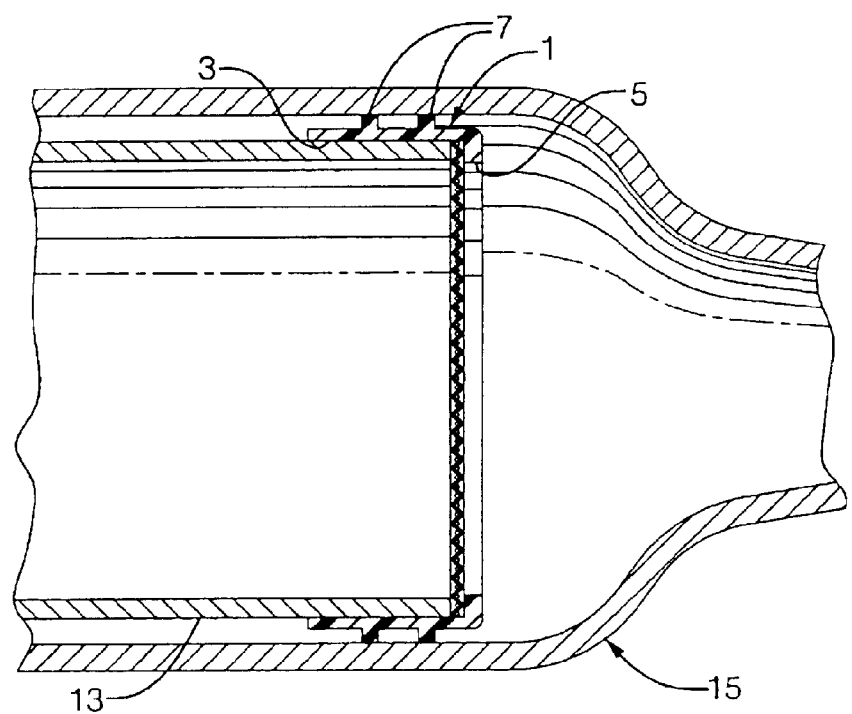
FIG. 6 is a partial cross-sectional view of an embodiment of a sorbent monolith having a seal disposed within a shell.

Referring to FIGS. 5 and 6, the seal 1 can be disposed around one or more ends of the monolith 13 such that shoulder member 5 engages the monolith 13, while the rib member 7 engages the shell. The monolith composition, geometry, and size is based upon the amount of fuel vapor to be treated. Typically, the monolith has a honeycomb geometry, with the combs through-channel having any multi-sided or rounded shape, with substantially square, triangular, pentagonal, hexagonal, heptagonal, octagonal, or similar geometries, and combinations comprising at least one of these geometries preferred due to ease of manufacturing and increased surface area. Generally the overall sorbent monolith has a geometry compatible with the desired location of the monolith in the vehicle, e.g., a substantially cylindrical monolith for location in a conduit.

Referring to FIG. 7, another embodiment of the seal 21 is illustrated. In this embodiment, in addition to the ribs 7, the seal further comprises a flare 23 disposed at one end of the seal 21. The optional flare 23 assists in assembly of the scrubber by assisting in aligning the seal as desired. As is shown in FIG. 8, the flare 23 of the seal 21 can be disposed about the monolith 13, while the shoulder member 5 engages the monolith 13.

Suitable sorbent monolith composition comprises a hydrocarbon removal material (e.g., a material useful in the adsorption and/or absorption and the desorption of hydrocarbons and other volatile components found in motor fuel), with the monolith formed from the desired removal material, or the removal material deposited on a monolith substrate. Possible sorbent materials include activated carbon, zeolites, aerogels, xerogels, and the like, as well as combinations comprising at least one of the foregoing materials. The sorbent material can also be mixed with binders, lubricants, glidents, enhancing agents, and the like, to allow for the formation into the desired shape, and the desired permeability and sorptive capacity.

As previously stated, the sorbent monolith is disposed within a shell. The shell can comprise any material compatible with the scrubber's operating environment (e.g., exposure to hydrocarbons, temperatures of about −40° C. to about 200° C., and the like). Generally, the shell, as well as any end-plate, end-cone, or other connection that may be disposed over one or more ends of the scrubber, comprises a ferrous material, such as stainless steel, and the like.

Employment of the seal comprising the rib(s) and the shoulder, as well as the other design features, enables effective sealing of the scrubber with a reduced scrap and rework rate. During manufacture and use, the shoulder engages and end of the monolith, while the ribs engage the shell. Consequently, unlike foam seals and rubber O-rings, the seal maintains its placement, resisting roll-off and movement during assembly.

The seal's shoulder protects the edges of the carbon monolith from chipping during the assembly process and prevents damage which can occur if the end of the carbon element contacts the internal ribs of the scrubber housing. Additionally, the seal can be presented to the assembly line in a single layer tray, where the carbon is inserted into the seal. This avoids handling of the seal by the operator.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An evaporative emission control device, comprising:
   a monolith;
   a shell;
   a seal disposed concentrically around an end of the monolith, wherein the seal comprises an inner surface having a diameter equal to or less than an outer diameter of the monolith, a shoulder member protruding from the seal and physically contacting at least a portion of an end face of the monolith, and a rib member disposed on an outer side of the seal and in physical contact with the shell.

2. The evaporative emission control device of claim 1, wherein the seal further comprises a material having a durometer hardness on a Shore A scale of about 20 to about 50.

3. The evaporative emission control device of claim 2, wherein the durometer hardness is about 25 to about 45.

4. The evaporative emission control device of claim 3, wherein the durometer hardness is about 30 to about 35.

5. The evaporative emission control device of claim 1, wherein the seal further comprises a flare disposed at an end of the seal opposite the shoulder member.

6. The evaporative emission control device of claim 1, wherein the seal further comprises a material selected from the group consisting of silicone, fluorosilicone, epichlorohydrin, and combinations comprising at least one of the foregoing materials.

7. The evaporative emission control device of claim 1, wherein the rib member comprises protrusions having a geometry selected from the group consisting of rounded, triangular, pointed, saw-toothed, square, hooked, curved, and combinations comprising at least one of the foregoing geometries.

8. The evaporative emission control device of claim 7, further comprising at least one additional rib member.

9. The evaporative emission control device of claim 1, wherein the seal further comprises a lubricant.

10. The evaporative emission control device of claim 9, wherein the lubricant is selected from a group consisting of talc, silica, fluorocarbon polymers, and combinations comprising at least one of the foregoing lubricants.

11. A method for using an evaporative emission control device, comprising:
    introducing air comprising a fuel vapor comprising hydrocarbons to a first end of a monolith;
    removing the hydrocarbons from the fuel vapor to produce a clean gas;
    exhausting the clean gas through a second end of the monolith; and
    introducing atmospheric gas through the second end to remove the hydrocarbons from the monolith;
    wherein a seal is disposed concentrically around an end of the monolith, wherein the seal comprises an inner surface having a diameter equal to or less than an outer diameter of the monolith, a shoulder member protruding from the seal and physically contacting at least a portion of an end face of the monolith, and a rib member disposed on an outer side of the seal and in physical contact with the shell.

12. The method of claim 11, wherein the seal further comprises a material having a durometer hardness on a Shore A scale of about 20 to about 50.

13. The method of claim 11, wherein the durometer hardness is about 25 to about 45.

14. The method of claim 13, wherein the durometer hardness is about 30 to about 35.

15. The method of claim 11, wherein the seal further comprises a flare disposed at an end of the seal opposite the shoulder member.

16. The method of claim 11, wherein the seal further comprises a material selected from the group consisting of silicone, fluorosilicone, epichlorohydrin, and combinations comprising at least one of the foregoing materials.

17. The method of claim 11, wherein the rib member comprises protrusions having a geometry selected from the group consisting of rounded, triangular, pointed, saw-toothed, square, hooked, curved, and combinations comprising at least one of the foregoing.

18. The method of claim 17, further comprising at least one additional rib member.

19. The method of claim 11, wherein the seal further comprises a lubricant.

20. The method of claim 19, wherein the lubricant is selected from the group consisting of talc, silica, fluorocarbon polymers, and combinations comprising at least one of the foregoing lubricants.

21. An evaporative emission control device, comprising:
    a monolith;
    a shell;
    a seal disposed concentrically around a first end of the monolith, wherein the seal comprises an inner surface having a diameter equal to or less than an outer diameter of the monolith, a shoulder member protruding from the seal and physically contacting at least a portion of an end face of the monolith, and a rib member disposed on an outer side of the seal and in physical contact with the shell, and wherein the seal and the monolith are capable of allowing air to pass through the first end and through an opposite end of the monolith.

22. The evaporative emission control device of claim 1, wherein the evaporative emission control device is a hydrocarbon scrubber.

23. The method of claim 11, wherein the evaporative emission control device is a hydrocarbon scrubber.

24. The evaporative emission control device of claim 21, wherein the evaporative emission control device is a hydrocarbon scrubber.

* * * * *